United States Patent
Fischer et al.

(10) Patent No.: US 12,019,166 B2
(45) Date of Patent: Jun. 25, 2024

(54) MULTIPLE REDUNDANT DISCIPLINED OSCILLATOR SYSTEMS IN A SPOOFING RESISTANT REFERENCE TIME SOURCE SYSTEM AND METHODS THEREOF

(71) Applicant: Orolia USA Inc., W. Henrietta, NY (US)

(72) Inventors: John Fischer, Corfu, NY (US); Matthias Lorentz, Choisel (FR)

(73) Assignee: OROLIA USA INC., W. Henrietta, NY (US)

( * ) Notice: Subject to any disclaimer, the term of this patent is extended or adjusted under 35 U.S.C. 154(b) by 293 days.

(21) Appl. No.: 17/374,465

(22) Filed: Jul. 13, 2021

(65) Prior Publication Data

US 2023/0023487 A1 Jan. 26, 2023

(51) Int. Cl.
*G01S 19/21* (2010.01)
(52) U.S. Cl.
CPC .................. *G01S 19/215* (2013.01)
(58) Field of Classification Search
CPC .................................... G01S 19/215
See application file for complete search history.

(56) References Cited

U.S. PATENT DOCUMENTS

| | | |
|---|---|---|
| 5,568,097 A | 10/1996 | Woodman, Jr. |
| 5,666,330 A | 9/1997 | Zampetti |
| 5,812,822 A | 9/1998 | Selway et al. |
| 6,141,769 A | 10/2000 | Petivan et al. |
| 6,640,311 B1 | 10/2003 | Knowles |
| 7,317,361 B2 | 1/2008 | Duven et al. |
| 7,646,254 B2 | 1/2010 | Kantor et al. |
| 2008/0244300 A1 | 10/2008 | Swaney et al. |
| 2010/0321118 A1 | 12/2010 | Smiley et al. |
| 2011/0103337 A1* | 5/2011 | Bryant .................. G04G 7/02 370/329 |
| 2015/0293234 A1* | 10/2015 | Snyder .................. G01S 19/21 342/357.59 |

(Continued)

FOREIGN PATENT DOCUMENTS

| | | |
|---|---|---|
| CN | 101441585 A | 5/2009 |
| EP | 3213116 A1 | 9/2017 |

(Continued)

*Primary Examiner* — Mohammed Waliullah
(74) *Attorney, Agent, or Firm* — Troutman Pepper Hamilton Sanders LLP (Rochester)

(57) ABSTRACT

A system wherein when a normal state is entered: discipline only one of at least three oscillators to an external reference; output frequency and time based on the other oscillators not being disciplined to the external reference; and monitor the output frequency difference of the one of the oscillators being disciplined and a composite value of the output frequency difference among the other oscillators. A spoofing state is identified when the monitored difference is more than a difference threshold. When the spoofing state is identified: reset the frequency and time of the oscillator in the spoofing state to match the composite value of the other oscillators; resume disciplining the oscillator in the spoofing state from the external reference after expiration of a time period; and clear the spoofing state and return to the normal state when the oscillators have the output frequency differences among the oscillators below the difference threshold.

30 Claims, 9 Drawing Sheets

(56) References Cited

U.S. PATENT DOCUMENTS

2016/0301416 A1   10/2016  Milijevic et al.
2017/0060101 A1    3/2017  Abbott et al.
2018/0011199 A1*   1/2018  Lombardi ............... G01S 19/14

FOREIGN PATENT DOCUMENTS

IT         202000011794  A1 *  5/2020
WO    WO-2021091414  A1 *  5/2021

* cited by examiner

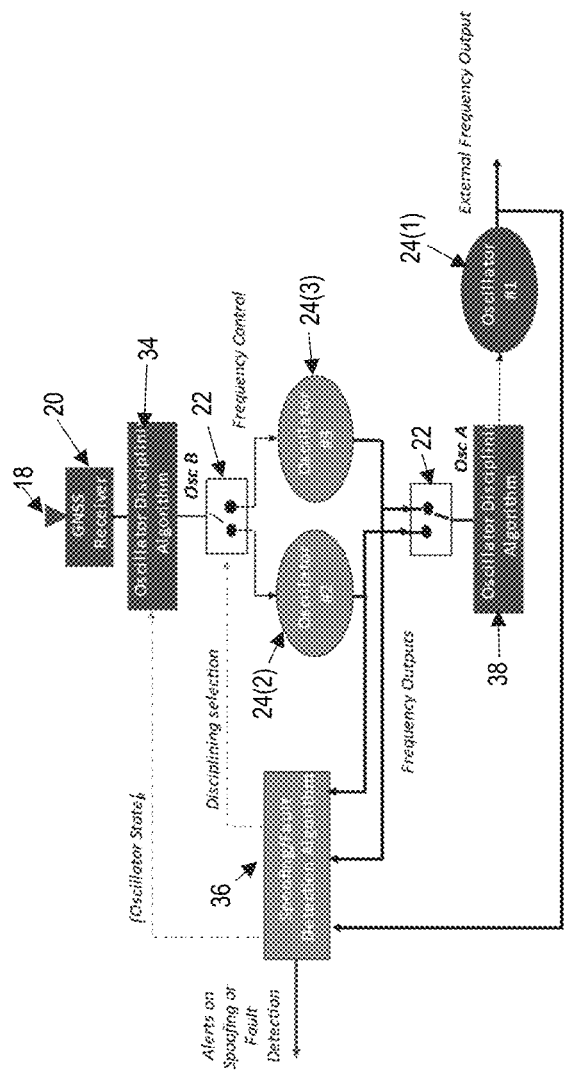
FIG. 4 steady state operation

MULTIPLE REDUNDANT DISCIPLINED OSCILLATOR SYSTEMS IN A SPOOFING RESISTANT REFERENCE TIME SOURCE SYSTEM AND METHODS THEREOF

FIELD

This technology relates to multiple redundant disciplined oscillator systems in a spoofing resistant reference time source system.

BACKGROUND

There are a variety of different types of reference time source systems, such as Global Navigation Satellite System (GNSS) system, grandmaster clocks, and primary time reference systems by way of example. With a GNSS system, a GNSS receiver determines a precise position on the surface of the earth by measuring the signal propagation time from multiple orbiting satellites. Each of these satellite has a precision clock in it which is accurately synchronized by ground control stations which are linked to the UTC time reference. Thus, a side benefit of these navigation systems is that the Earth is covered with a precise time synchronization signal.

With traditional time synchronization, nanosecond level synchronization is typically achieved using a low-cost GNSS receiver and a timing processor to improve the accuracy of a stable local oscillator (such as an Oven Controlled crystal Oscillator (OCXO) or atomic oscillator). More specifically, the GNSS receiver is used in conjunction with the controllable oscillator and the timing processor to control or "discipline" the controllable oscillator to the more accurate frequency reference derived from the satellite signal. The timing processor commands the GNSS receiver to operate in favorable modes for precision timing instead of positioning or navigation. The one Pulse Per Second (1PPS) signal from the GPS is used as a reference to phase lock the stable local oscillator. A controllable oscillator (such as a voltage-controlled oscillator (VOCXO)) is used so it can be adjusted in phase relative to the 1PPS reference.

Accordingly, using GNSS to discipline a local oscillator improves its accuracy and synchronizes it to the absolute UTC time reference. However, using this external GNSS source opens a GNSS timing system up to spoofing attacks. In particular, a system could be pulled out of sync by a bad actor, and this could be catastrophic if the timing system is used in a critical infrastructure application.

SUMMARY

An oscillator management system includes one or more spoofing resistant reference time source systems each comprising one or more oscillators coupled to an oscillator management computing device. The oscillator management computing device comprises a memory coupled to a processor which is configured to execute programmed instructions stored in the memory to enter three or more of the oscillators into a normal disciplining steady state when the three or more of the oscillators have output frequency differences among the three or more of the oscillators that are below a set frequency difference threshold. When the normal disciplining steady state is entered: discipline only one of the three or more of the oscillators to an external time reference; output frequency and time based on the other ones of the three or more of the oscillators not being disciplined to the external time reference; and monitor the output frequency difference of the one of the three or more of the oscillators being disciplined by the external time reference and a composite value of the output frequency difference among the other ones of the three or more of the oscillators. A spoofing detected state is identified when the monitored output frequency difference is more than the set frequency difference threshold. When the spoofing detected state is identified: reset the frequency and time of the one of the three or more of the oscillators in the identified spoofing detected state to match the composite value of all of the other ones of the three or more of the oscillators; resume disciplining the one of the three or more of the oscillators in the identified spoofing detected state from the external time reference after expiration of a set time period; and clear the spoofing detected state indication and return to the normal disciplining steady state when the oscillators have the output frequency differences among the three or more of the oscillators that are below the set frequency difference threshold.

A non-transitory computer readable medium having stored thereon instructions comprising executable code which when executed by at least one processor, cause the processor to enter three or more oscillators, that are in one or more spoofing resistant reference time source systems, into a normal disciplining steady state when the three or more of the oscillators have output frequency differences among the three or more of the oscillators that are below a set frequency difference threshold. When the normal disciplining steady state is entered: discipline only one of the three or more of the oscillators to an external time reference; output frequency and time based on the other ones of the three or more of the oscillators not being disciplined to the external time reference; and monitor the output frequency difference of the one of the three or more of the oscillators being disciplined by the external time reference and a composite value of the output frequency difference among the other oscillators. A spoofing detected state is identified when the monitored output frequency difference is more than the set frequency difference threshold. When the spoofing detected state is identified: reset the frequency and time of the one of the three or more of the oscillators in the identified spoofing detected state to match the composite value of all of the other ones of the three or more of the oscillators; resume disciplining the one of the three or more of the oscillators in the identified spoofing detected state from the external time reference after expiration of a set time period; and clear the spoofing detected state indication and return to the normal disciplining steady state when the three or more of the oscillators have the output frequency differences among the three or more of the oscillators that are below the set frequency difference threshold.

A method includes entering, by a computing device, three or more oscillators, that are in one or more spoofing resistant reference time source systems, into a normal disciplining steady state when the three or more of the oscillators have output frequency differences among the three or more of the oscillators that are below a set frequency difference threshold. When the normal disciplining steady state is entered: discipline only one of the three or more of the oscillators to an external time reference; output frequency and time based on the other ones of the three or more of the oscillators not being disciplined to the external time reference; and monitor the output frequency difference of the one of the three or more of the oscillators being disciplined by the external time reference and a composite value of the output frequency difference among the other ones of the three or more of the oscillators. A spoofing detected state is identified, by the computing device, when the monitored output frequency difference is more than the set frequency difference threshold. When the spoofing detected state is identified: reset the frequency and time of the one of the three or more of the oscillators in the identified spoofing detected state to match the composite value of all of the other ones of the three or more of the oscillators; resume disciplining the one of the three or more of the oscillators in the identified spoofing detected state from the external time reference after expiration of a set time period; and clear the spoofing detected state indication and return to the normal disciplining steady state when the three or more of the oscillators have the output frequency differences among the three or more of the oscillators that are below the set frequency difference threshold.

This technology provides a number of advantages including providing methods and devices that counter reference time source spoofing attacks through unique configurations of multiple redundant disciplined oscillators in a time server system. With examples of this spoofing resistant technology, the time server system are able to substantially reduce the mean time between failure. Additionally, examples of this technology are advantageously able to identify and address various fault conditions in addition to being resistant to spoofing.

BRIEF DESCRIPTION OF THE DRAWINGS

FIG. 4 is a functional block diagram of an example of a method for managing steady state operation in the spoofing resistant reference time source system in FIG. 1;

DETAILED DESCRIPTION

Figure 1:
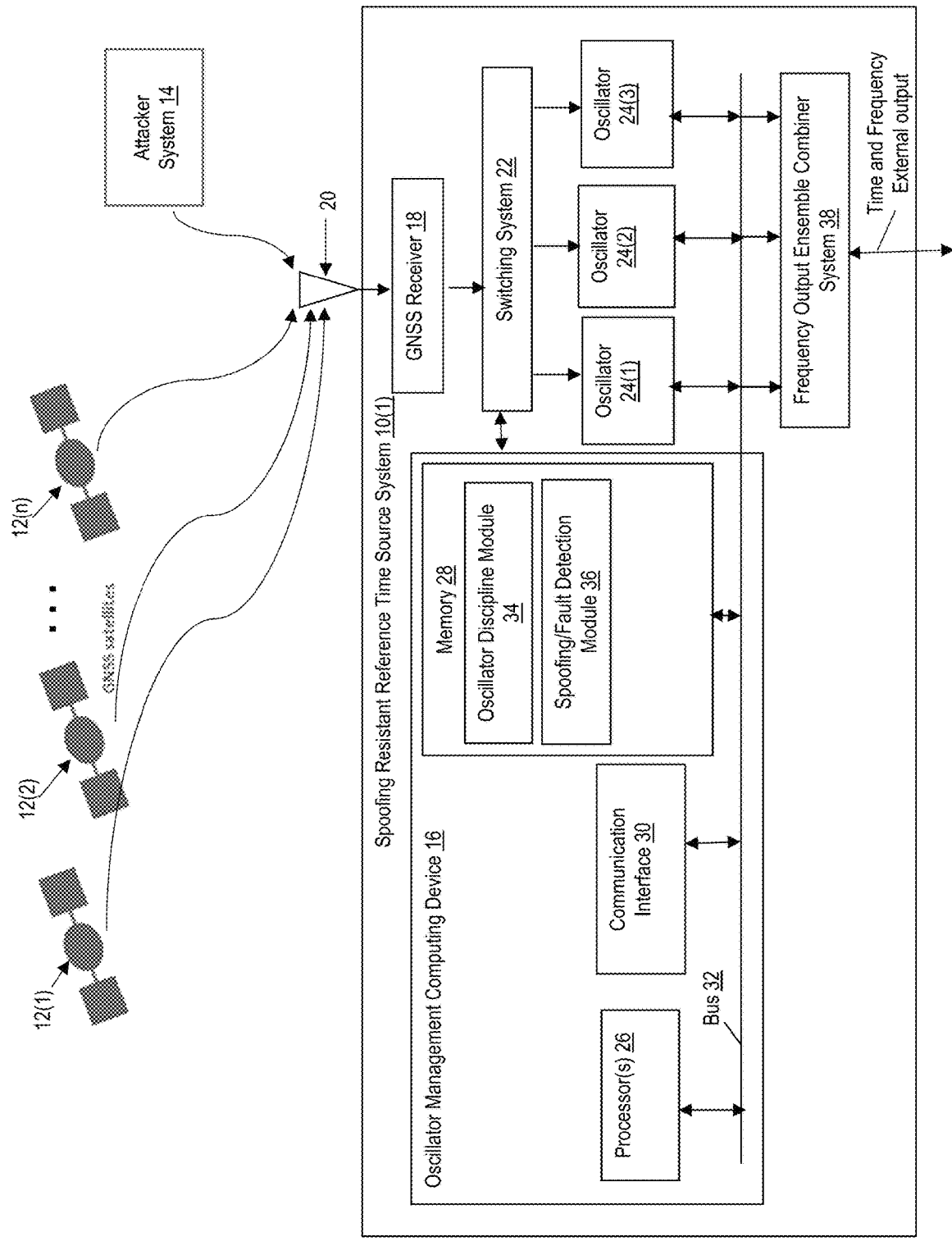
FIG. 1 is a block diagram of an exemplary environment with an example of a spoofing resistant reference time source system.

An environment with an example of a spoofing resistant reference time source system 10(1) is illustrated in FIG. 1. In this example, the environment includes the spoofing resistant reference time source system 10(1), Global Navigation Satellite System (GNSS) satellite transmitters 12(1)-**12(*n*), and an attacker system 14**, although other types and/or numbers of other systems, devices, components, and/or other elements in other configurations may be used, such as other external time reference systems may be used. This technology provides a number of advantages including providing methods and devices that counter spoofing attacks through unique configurations of multiple redundant disciplines oscillators in a spoofing resistant reference time source system.

Referring more specifically to FIG. 1, in this example the spoofing resistant reference time source system 10(1) includes an oscillator management computing device 16, a GNSS receiver 18 with an antenna 20, a switching system 22, and oscillators 24(1)-24(3) which are coupled together by a bus or other communication link 32, although the system could include other types and/or numbers of systems, devices, components, and/or other elements in other configurations, such as other types of receiver systems for other external time sources.

The oscillator management computing device 16 of the spoofing resistant reference time source system 10(1) includes at least one processor 26, a memory 28, and a communication interface 30, although the oscillator management computing device 16 can include other types and/or numbers of systems, devices, components, and/or other elements in other configurations. The processor 26 of the oscillator management computing device 16 may execute programmed instructions stored in the memory for the any number of the functions or other operations illustrated and described by way of the examples herein. The processor 26 of the oscillator management computing device 16 may include one or more CPUs or other processors with one or more processing cores, for example, although other types of processor(s) can also be used.

The memory 28 of the oscillator management computing device 16 stores these programmed instructions for one or more aspects of the present technology as illustrated and described herein, although some or all of the programmed instructions could be stored elsewhere. By way of example, one or more aspects of the technology may be executed in a cloud computing environment by one or cloud computing servers. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor (s) 26, can be used for the memory 28.

Accordingly, the memory 28 of the oscillator management computing device 16 can store application(s) that can include executable instructions that, when executed, cause the oscillator management computing device 16 to perform actions, such as to transmit, receive, or otherwise process signals related to navigation or other positioning, to detect and counter spoofing attacks, and to perform other actions, such as detect faults, as illustrated and described by way of the examples herein with reference to FIGS. 1-6. The application(s) can be implemented as modules or components of other application(s). Further, the application(s) can be implemented as operating system extensions, modules, plugins, or the like. In this example, the memory 28 includes an oscillator discipline algorithm or module 34, and a spoofing/fault detection algorithm or module 36, although the memory may have other types and/or numbers of other algorithms, modules, programmed instructions, and/or other data.

The oscillator disciplining algorithm or module 34 includes programmed instructions to control an output of oscillators 24(1)-24(3) to agree with the signals broadcast by one or more GNSS satellites 12(1)-12(n) as well as execute other functions as illustrated and described by way of the examples herein. Additionally, in this particular example, the spoofing/fault detection algorithm or module 36 includes programmed instructions to monitor at least one of frequency or time synchronization outputs from one or more of the oscillators 24(1)-24(3) and provide an alert or other action when any spoofing or fault is detected as well as execute other functions as illustrated and described by way of the examples herein.

The communication interface 30 of the oscillator management computing device 16 operatively couples and communicates between the oscillator management computing device 16 and the GNSS receiver 18 with antenna 20, the switching system 22, and the oscillators 24(1)-24(3) which are all coupled together by one or more communication network(s), although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

The GNSS receiver 18 with the antenna 20, the switching system 22 and the one or more oscillators 24(1)-24(3) of the spoofing resistant reference time source system 10(1) are coupled together in various configurations as illustrated by way of examples herein, although the time server system 10(1) may have other configurations. The GNSS receiver 18 with antenna 20 is configured to capture signals from GNSS satellites 12(1)-12(n) when navigation or other positioning is to be determined, although other types of receivers may be used.

In various examples, one or more of the oscillators 24(1)-24(3) is an oscillator whose output is controlled to agree with the signals broadcast by one or more of the GNSS satellites 12(1)-12(n), although other numbers and/or types of controlled or disciplined oscillators or other timing elements with similar accuracy may be used. Additionally, in this example the antenna 20 is an Omni-directional antenna, although other types of antennas or other receivers or transceivers may be used, such as a directional antenna.

In this example, the switching system 22 is configured to manage the configurations of the one or more disciplined oscillators 24(1)-24(3) as shown by way of example in FIGS. 1, 2, 4, 6, and 7, although the switching system 22 may have other types and/or numbers of other configurations and/or functions. The switching system 22 may comprise various numbers and/or types of switches, such as one or more commutations switches, although other types and/or numbers of switches in other configurations may be used as illustrated by way of examples herein.

Figure 5A:
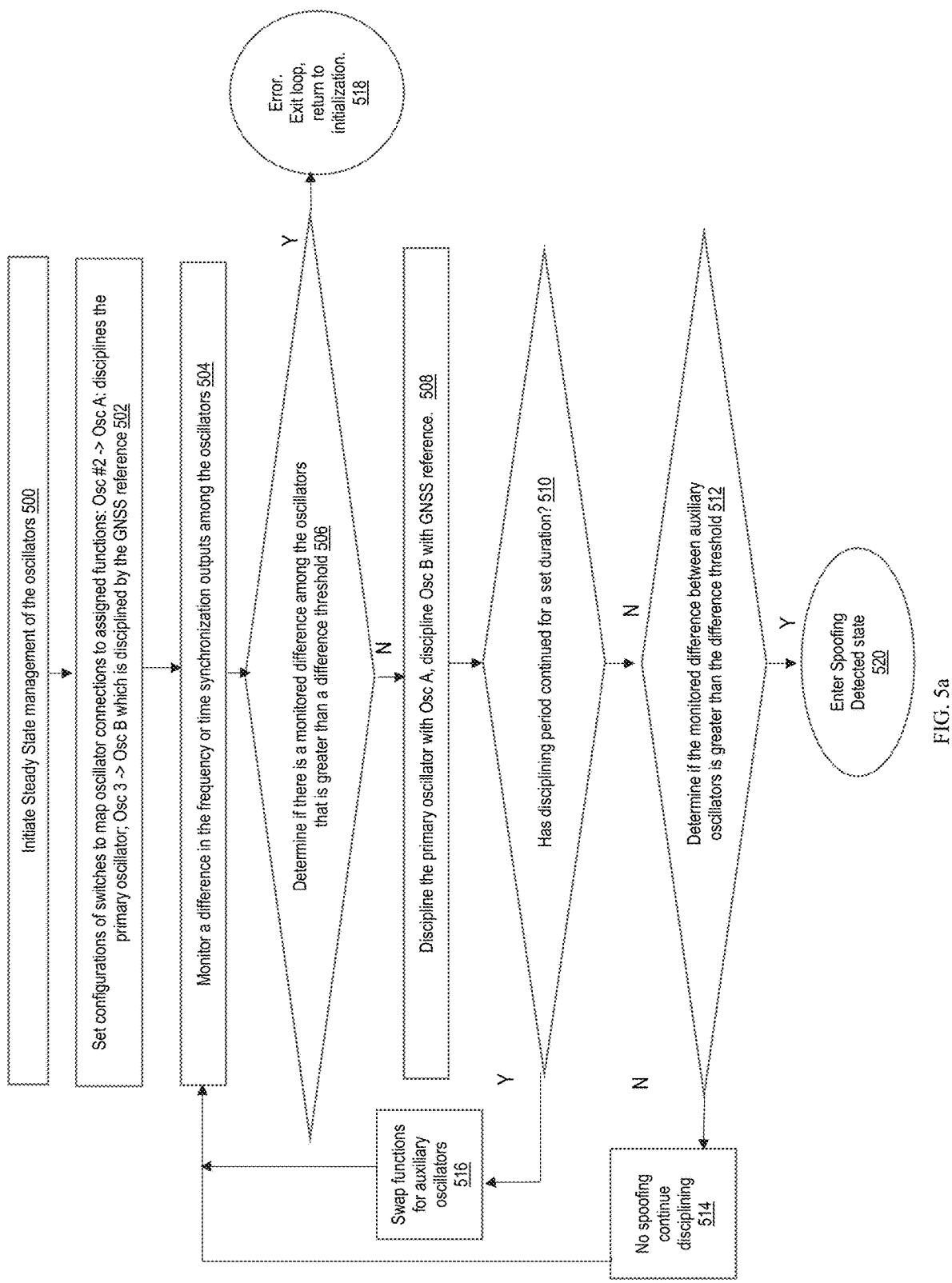
FIG. 5*a* is a flowchart of an example of the method for managing steady state operation in the spoofing resistant reference time source system.
Figure 5B:
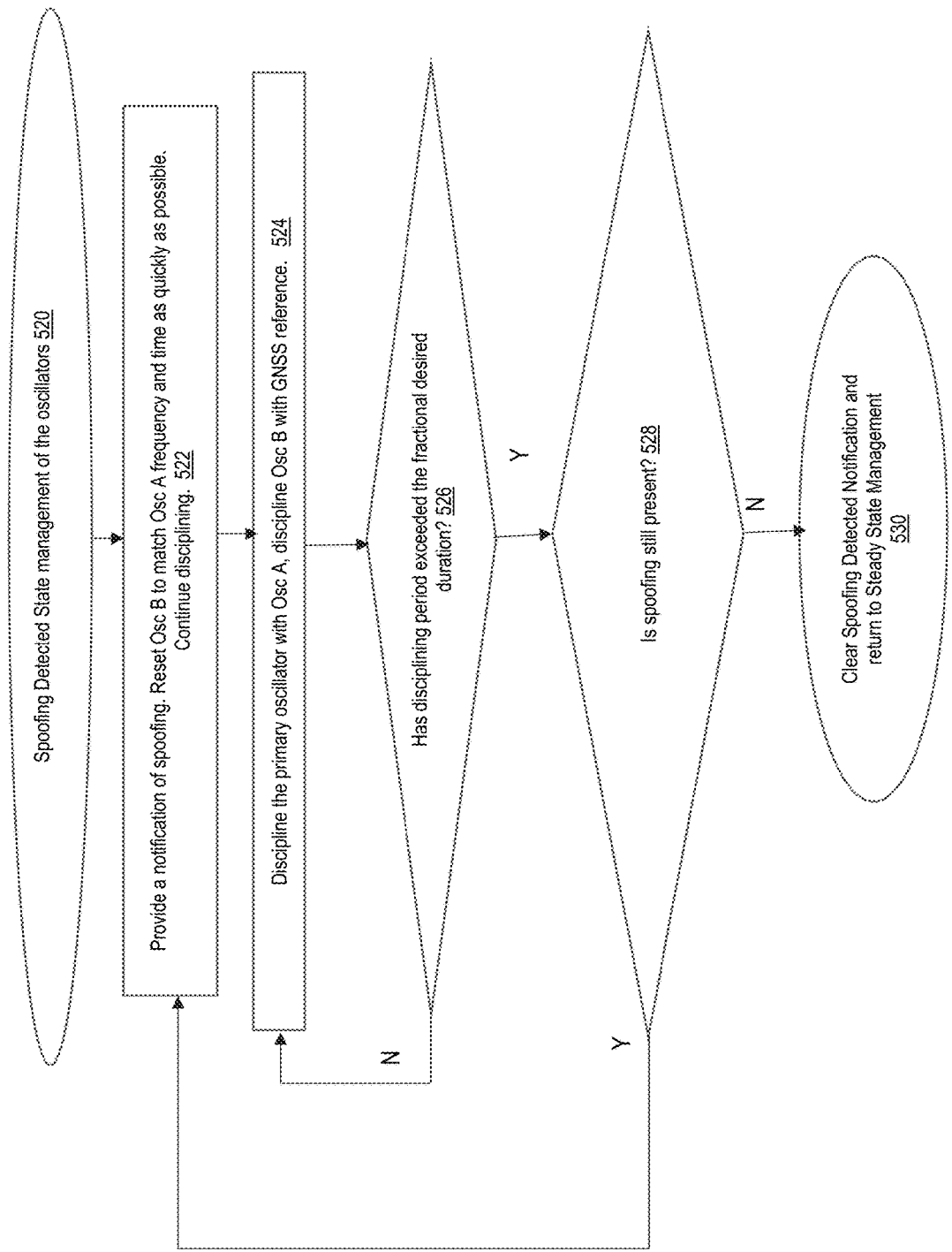
FIG. 5*b* is a flowchart of an example of the method for managing spoofing detection in the spoofing resistant reference time source system.
Figure 6:
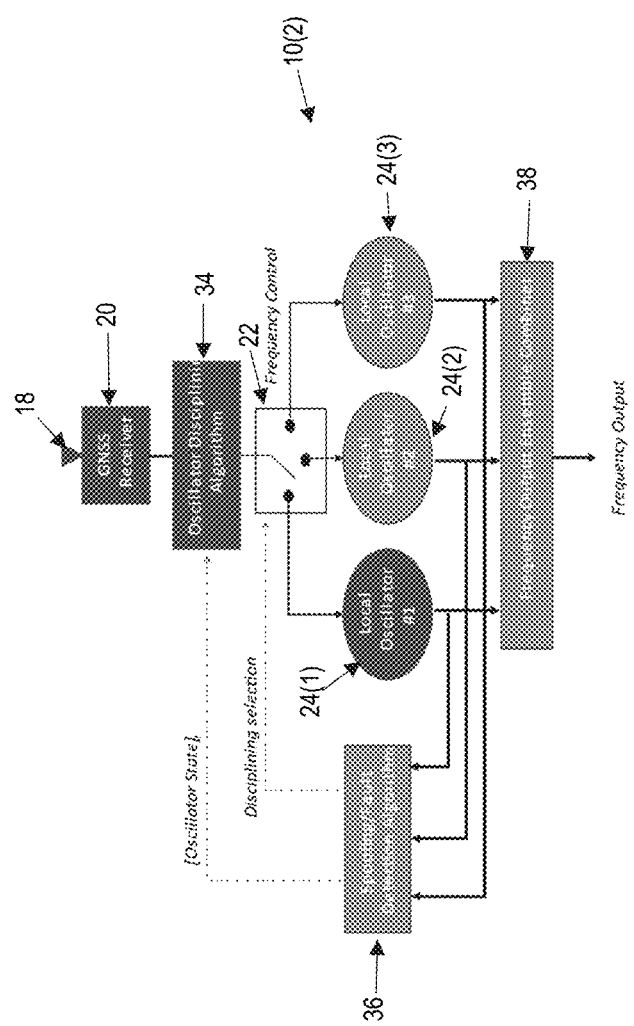
FIG. 6 is a functional block diagram of an example of another method for managing steady state and spoofing detection operations with an alternate configuration for the spoofing resistant reference time source system.

The frequency output ensemble combiner system 38 is an option in an alternative design for spoofing resistant reference time source system 10(2) discussed herein with reference FIG. 6 and is not needed for the example shown in FIGS. 4-5b. The frequency output ensemble combiner 38 creates a composite time and frequency output from all the available oscillators. In one example, the frequency output ensemble combiner system 38 is a simple switch which selects the best oscillator. By way of example, in the implementation illustrated in FIG. 2, the Primary Oscillator is always selected, although the frequency output ensemble combiner system 38 can be configured in other manners. For example, in another more complex exemplary implementation of the spoofing resistant reference time source system 10(1), the frequency output ensemble combiner system 38 can be included as shown in FIG. 6 and configured so that the time and frequency outputs of all available properly functioning oscillators are statistically combined with weightings to achieve optimal accuracy.

Further, in this illustrated example, each of the one or more oscillators 24(1)-24(3) is an oscillator with at least about $10^{-6}$ stability, although other stability ranges may be used. By way of example only, each of the one or more oscillators 24(1)-24(3) may be an atomic oscillator with about a $10^{-11}$-$10^{-12}$ stability. Atomic oscillators are desirable in examples of this technology since their high stability allows the detection of a spoofing attack early and also reduces the probability of a false alarm, since normal drift in frequency (all clocks have some drift) could be confused with a spoofing attack. By way of example, a sophisticated bad actor could try to pull off the frequency very slowly, so having atomic oscillators which have a high stability makes the probability of detection high and the false alarm rate low.

In this example, three oscillators 24(1)-24(3) are used in spoofing resistant reference time source system 10(1), although other numbers and/or different types of oscillators may be used. A minimum of three oscillators 24(1)-24(3) in spoofing resistant reference time source system 10(1) is recommended in examples of this technology because with only two oscillators it would be impossible to differentiate between a spoofing event and an internal oscillator failure when the two oscillators do not agree. With a minimum of three oscillators 24(1)-24(3), a majority rule and whichever majority of the oscillators 24(1)-24(3), in this example, agree will be assumed to be the correct time. There is only a finite probability that all three oscillators 24(1)-24(3) in this example disagree because of multiple faults occurring at once or a spoofing incident occurring during a fault condition. Greater redundancy of additional numbers of oscillators would further reduce this finite probability.

Further, in the examples illustrated and described herein, the oscillators 24(1)-24(3) are all the same type of oscillator, such as rubidium atomic clocks or quartz atomic clocks by way of example, although in other examples different types of oscillators may be used. Accordingly, in other examples of the spoofing resistant reference time source system 10(1) where at least one of the oscillators 24(1)-24(3) comprises a different type of oscillator, then in these examples the oscillators 24(1)-24(3) with the same or similar stability characteristics would be selected or otherwise designated as the auxiliary ones since these will be setting the holdover performance.

By way of further example, the spoofing resistant reference time source system 10(1) may be configured to have: (1) all three oscillators 24(1)-24(3) as rubidium atomic clocks; and (2) two of the oscillators 24(1)-24(3) that are selected or designated as the auxiliary oscillators as rubidium atomic clocks while the other one of the oscillators 24(1)-24(3) that acts as the primary oscillator can be whatever other system requirements dictate, such as a low phase OCXO could be the primary oscillator for a communication system by way of example. Further, although in these examples the same types of oscillators are used for the auxiliary oscillators, in other examples similar types of oscillators, e.g. different types of oscillators with similar stability and holdover performance, could also be used.

Additionally, in this example, the GNSS satellite transmitters 12(1)-12(n) are illustrated, although other types and/or numbers of satellite transmitters may be used. The GNSS satellites 12(1)-12(n) are configured to broadcast GNSS signals which can be received and processed by the spoofing resistant reference time source system 10(1) for assistance with timing.

Further, in this example the attacker system 14 includes at least one processor, a memory, a communication interface, a GNSS receiver which includes an antenna, which are coupled together by a bus or other communication link, although the attacker system 14 can include other types and/or numbers of systems, devices, components, and/or other elements in other configurations. The attacker system 14 may receive signal and may generate a GNSS spoofing signal to, for example, the time server system 10(1).

Although in this exemplary environment the spoofing resistant reference time source system 10(1), the GNSS satellite transmitters 12(1)-12(n), and attacker equipment computing device 14 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the oscillator management computing device 16, cause the processor to carry out steps necessary to implement the methods of the examples of this technology that are illustrated and described herein.

Exemplary methods for initialization and managing steady state operation by detecting and countering spoofing and/or faults in spoofing resistant reference time source system 10(1) will now be described by way of various examples with reference to FIGS. 1-7.

Exemplary Initialization

Figure 2:
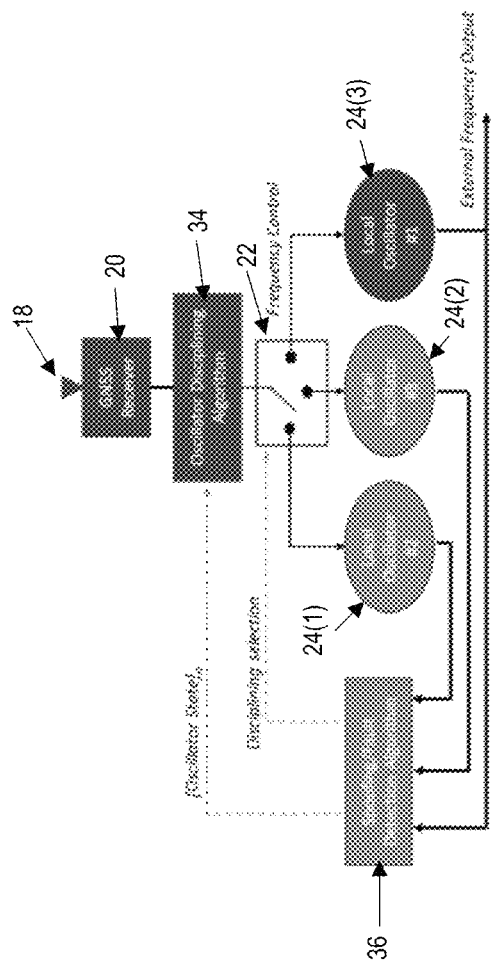
FIG. 2 is a functional block diagram of a method for managing initialization of multiple redundant oscillators in the spoofing resistant reference time source system shown in FIG. 1.
Figure 3:
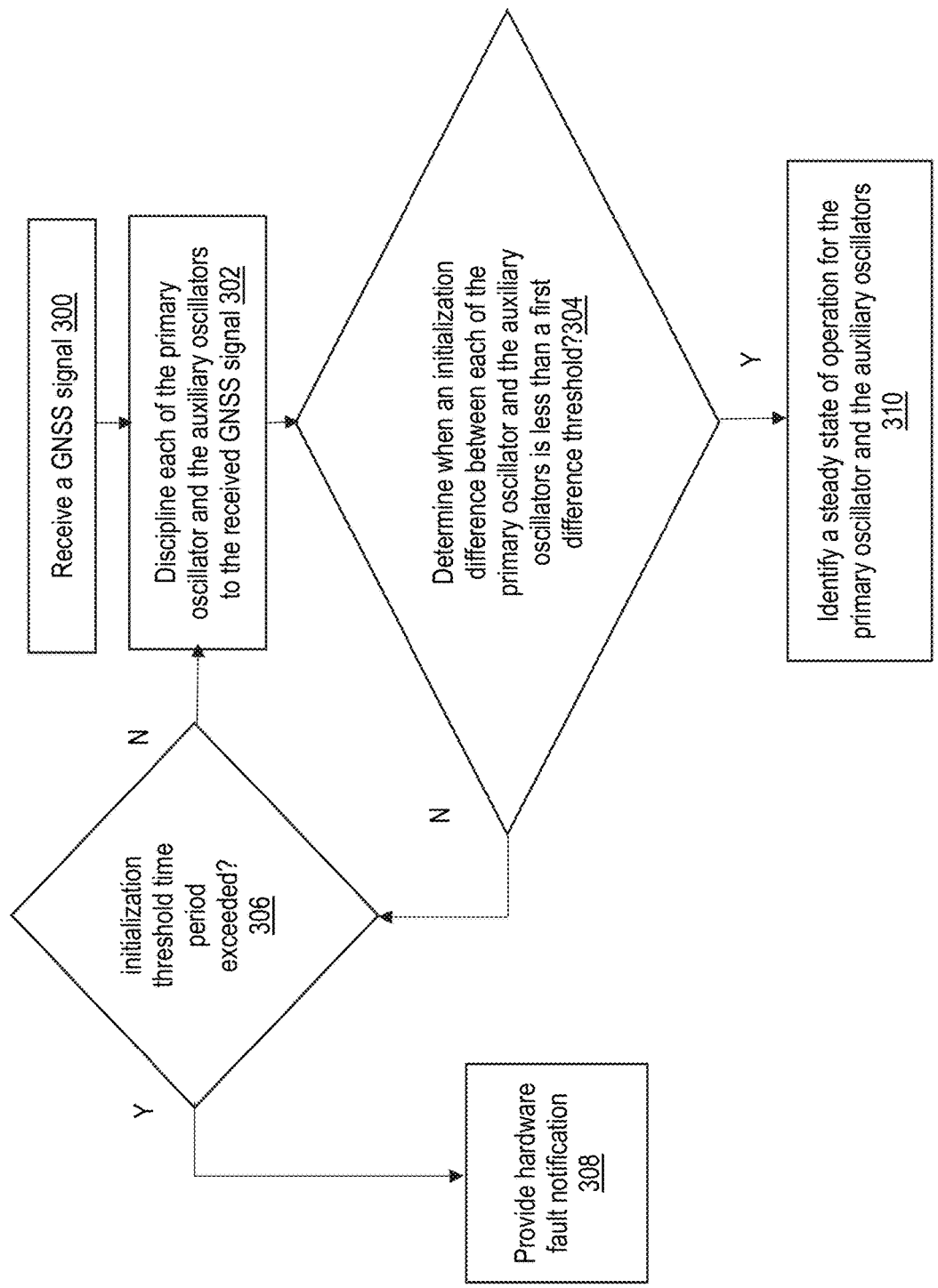
FIG. 3 is a flowchart of an example of the method for managing initialization of multiple redundant oscillators in the spoofing resistant reference time source system.

Referring more specifically to FIGS. 2-3, a functional block diagram and flow chart of an example of a method for initialization of oscillators 24(1)-24(3) in spoofing resistant reference time source system 10(1) is illustrated. In this example, in step 300 a GNSS signal received by the GNSS receiver 18 and antenna 20 from one or more of the satellites 12(1)-12(n), although other timing signals from other reference or trusted sources could be used. Additionally, an oscillator disciplining algorithm or module 34 is executed by the oscillator management computing device 16 to manage the disciplining of the oscillators 24(1)-24(3) during this exemplary initialization.

In step 302, all the oscillators 24(1)-24(3) are disciplined in parallel to the GNSS signal received by the GNSS receiver 18 and antenna 20 from one or more of the satellites 12(1)-12(n), although again the oscillators 24(1)-24(3) could be disciplined to other reference time sources. In this example the commutation switch in switching system 22 is not used in the initialization process only. The received GNSS signal is used by the oscillator management computing device 16 executing the oscillator disciplining module 34 to discipline each of the oscillators 24(1)-24(3) to the received GNSS signal, although other manners for disciplining the oscillators 24(1)-24(3) may be used. Each second, all three oscillators 24(1)-24(3) are updated with the GNSS signal until all three oscillators 24(1)-24(3) have been disciplined to reach their steady state phase and frequency lock conditions. By way of example this initialization process typically may take about twenty-four hours, depending on the particular type of oscillators used for each of the oscillators 24(1)-24(3). Although in this example the oscillators 24(1)-24(3) are being disciplined separately and sequentially, this configuration functionally equates to parallel disciplining as mentioned above. Additionally, in this example during the initialization, there is no spoofing or fault detection available.

In step 304, the oscillator management computing device 16 determines if the three oscillators 24(1)-24(3) have been disciplined to reach their steady state phase and frequency lock conditions. If in step 304 the oscillator management computing device 16 determines the three oscillators 24(1)-24(3) have not been disciplined to reach their steady state phase and frequency lock conditions, then the No branch is taken to step 306.

In step 306, the oscillator management computing device 16 determines if the initialization process has lasted longer than an initialization threshold time period. If in step 306, the oscillator management computing device 16 determines the initialization process has lasted longer than an initialization threshold time period, then the No branch is taken to step 308 where the oscillator management computing device 16 may provide a notification of a hardware fault with one or more of the three oscillators 24(1)-24(3) which could not be disciplined. If in step 306, the oscillator management computing device 16 determines the initialization process has not lasted longer than an initialization threshold time period, then the Yes branch is taken to step 302 as described earlier.

If back in step 304, the oscillator management computing device 16 determines the three oscillators 24(1)-24(3) have been disciplined to reach their steady state phase and frequency lock conditions, then the Yes branch is taken to step 310 where the oscillator management computing device 16 identifies a steady state of operation for the three oscillators 24(1)-24(3) in this example.

An example of pseudo code for the oscillator discipline algorithm or module 34 executed by the oscillator management computing device 16 is set forth below:

```
Init: {
    DetectionState = Init;
    loop {
        Discipline all oscillators;
        if (all oscillators meet the steady state sync criteria and difference
            among all oscillator frequencies are less than epsilon ε) then {
            DetectionState = SteadyState;
            exit loop; }
        if (initialization process last longer then x hours) then assert potential
            HW fault;
    } %endloop
} %end Init;
```

Exemplary Disciplining Commutation Period, $\tau_d$

The period for disciplining a single auxiliary oscillator needs to be long enough so that a slow-moving spoofer can be detected, but not so long that the other free running auxiliary oscillator controlling the system has drifted beyond its accuracy specification. Basically, the spoofing resistant reference time source system 10(1) is always in holdover, it is just being refreshed by a new accurately disciplined oscillator from GNSS every $\tau_d$. If we refer to the specified holdover time of the system as $\tau_H$ (for example, a spoofing resistant reference time source system 10(1) that maintains 1 us time accuracy over 24 hours: $\tau_H$=24 hours), then we want the commutation period to be much less than this. Suggest starting off with $\tau_d$=0.1*$\tau_H$. In this example, the permissible frequency error among oscillators is set as ε.

Exemplary Management of Steady State and Detected Spoofing Operations

Referring more specifically to FIGS. 4-5b, a functional block diagram and flowcharts of an example of methods for managing steady state and spoofing detected operations of the oscillators 24(1)-24(3) in the spoofing resistant reference time source system 10(1) once initialized is illustrated.

In this example, once initialization is complete as illustrated by way of by way of the example in FIGS. 2-3, then in FIGS. 4 and 5a starting in step 500 the oscillator management computing device 16 initiates steady state management of the oscillators 24(1)-24(3) in the spoofing resistant reference time source system 10(1).

In step 502, the oscillator management computing device 16 sets configurations of one or more switches in the switching system 22 to discipline the primary oscillator 24(1) with one of the auxiliary oscillators 24(2) or 24(3) in this example. In this example, the name Oscillator A is assigned to one of the auxiliary oscillators 24(2) or 24(3) chosen for that function. Additionally, in this example the name Oscillator B is assigned to the other one of the auxiliary oscillators 24(2) or 24(3) (or if more than two auxiliary oscillators, then one of the other oscillators) and is chosen to be disciplined by the GNSS reference signal or other trusted time source. In step 504, the oscillator management computing device 16 executing the spoofing/fault detection module 36 monitors a difference in the frequency or time synchronization outputs among the oscillators 24(1)-24(3).

In step 506, the oscillator management computing device 16 determines if there is a difference in the frequency or time synchronization outputs among the oscillators 24(1)-24(3) that is greater than a difference threshold. If in step 506 the oscillator management computing device 16 determines the difference in the frequency or time synchronization outputs among the oscillators 24(1)-24(3) is greater than a difference threshold, then the Yes branch is taken to step 518 to exit this example of the method, identify an error and return to the initialization process illustrated and described by way of example with reference to FIGS. 2 and 3 and attempt to recover from the error.

If in step 506 the oscillator management computing device 16 determines the difference in the frequency or time synchronization outputs among the oscillators 24(1)-24(3) is not greater than a difference threshold, then the No branch is taken to step 508.

In step 508, the oscillator management computing device 16 in this example will discipline the primary oscillator 24(1) with the assigned auxiliary oscillator A, one of the auxiliary oscillators 24(2)-24(3) in this example, and discipline the assigned oscillator B, the other one of the auxiliary oscillators 24(2)-24(3) in this example, with the GNSS reference from the GNSS receiver 18 in this example.

In step 510, the oscillator management computing device 16 will determine if the disciplining has continued for the set or otherwise desired duration. If the oscillator management computing device 16 determines the disciplining has continued for the set duration, then the Yes branch is taken to step 516.

In step 516, the oscillator management computing device 16 will swap or switch the prior assignments of auxiliary oscillator functions discussed in the example above (or if more than two auxiliary oscillators are used, then the next succeeding oscillators are chosen so that eventually all auxiliary oscillators get treated equally). Processing then continues back to step 504 as described earlier.

If back in step 510, the oscillator management computing device 16 determines the disciplining has not continued for the set duration, then the No branch is taken to step 512. In step 512, the oscillator management computing device 16 determines if a difference in the frequency or time synchronization outputs between the auxiliary oscillators 24(2)-24(3) is greater than the difference threshold. In this example, the threshold difference is the same throughout, but in other examples different threshold differences could be used. Additionally and by way of example, the oscillator management computing device 16 can determines if a difference in the frequency or time synchronization outputs between the auxiliary oscillators 24(2)-24(3) is greater than the difference threshold by monitoring the output frequency difference of the one of the oscillators being disciplined by the external time reference and a composite value of the output frequency difference among the other oscillators to determine when a Spoofing detected state has been detected. The oscillator management computing device 16 can execute a variety of different statistical combining methods, such as averaging by way of example, to determine the composite value.

If in step 512 the oscillator management computing device 16 determines that the frequency or time synchronization outputs difference is less than the difference threshold, then the No branch is taken to step 514. In step 514, the oscillator management computing device 16 indicates normal steady state operation and disciplining continues by returning to step 504 as described earlier.

If in step 512, the oscillator management computing device 16 determines the difference in the frequency or time synchronization outputs between the auxiliary oscillators 24(2)-24(3) is greater than the difference threshold, then the Yes branch is taken to step 520, where the oscillator management computing device 16 changes the state to Spoofing Detected.

Next in FIGS. 4 and 5b, starting in step 520 the oscillator management computing device 16 initiates spoofing detected management of the oscillators 24(1)-24(3) in the spoofing resistant reference time source system 10(1).

Next, in step 522, in this example the oscillator management computing device 16 may provide a notification of detected spoofing and/or take another corrective action and then attempt to recover from the spoofing attack, although other types and/or numbers of actions may be taken. In this example, the oscillator management computing device 16 continues to discipline the primary oscillator (in this example oscillator 24(1), with Oscillator A, the uncorrupted auxiliary device. Next, the oscillator management computing device 16 attempts to recover the corrupted Oscillator B by resetting it to match Oscillator A. Depending on the filtering parameters used in disciplining the oscillators 24(1)-24(3) and the performance constraints on rapid changes or discontinuities in time or frequency, the reset process may not be immediate, but typically should be implemented as quickly as practical.

In step 524 the oscillator management computing device 16 continues to discipline the primary oscillator from Oscillator A and now disciplines the newly reset Oscillator B from the GNSS reference signal for a spoofing recovery period of time, which in this example is a fraction of the normal set or desired duration of disciplining, although other types and/or number of corrective and/or other actions may be taken.

In step 526 the oscillator management computing device 16 determines if the spoofing recovery period of time has expired. If the oscillator management computing device 16 determines the spoofing recovery period of time has not expired, then the No branch is taken back to step 524 where the disciplining process continues as describe earlier. If the oscillator management computing device 16 determines the spoofing recovery period of time has expired, then the Yes branch is taken to step 528 to determine if the detected spoofing is now gone.

In step 528 the oscillator management computing device 16 determines if spoofing is still present based on the difference in the frequency or time synchronization outputs between the auxiliary oscillators 24(2)-24(3) and a difference threshold. If the oscillator management computing device 16 determines spoofing is no longer present because the difference in the frequency or time synchronization outputs between the auxiliary oscillators 24(2)-24(3) is less than the difference threshold, then the Yes branch is taken to step 530. In step 530, the oscillator management computing device 16 may clear and change the Spoofing Detected to the Steady State and then return to step 504 in FIG. 5a as described earlier. If the oscillator management computing device 16 determines spoofing is still present because the difference in the frequency or time synchronization outputs between the auxiliary oscillators 24(2)-24(3) is greater than the difference threshold, then Yes branch is taken back to step 524 where the algorithm attempts again to recover from the spoofing attack.

Accordingly, as illustrated in the example above, a spoofing/fault detection algorithm or module 36 executed by the oscillator management computing device 16 may be programmed to manage these steady state and spoofing detected operations by monitoring frequency or time synchronization outputs from oscillators 24(1)-24(3) and to take an action, such as generating an alert notification and taking corrective action against the spoofing, when any spoofing or a fault detected. An example of pseudo code for the spoofing/fault detection algorithm or module 36 is set forth below:

```
Steady State: {
  loop {
    if (difference among any of the oscillator's frequencies are
        greater than epsilon ε) then {
      DetectionState = Init;
      exit loop;    %something is wrong, we shouldn't be in
        this state unless all oscillators are in agreement
    Swap auxiliary oscillators #2 and #3 to be assigned to A and B;
      %Oscillator A is our known good reference and will used for
        disciplining our primary oscillator Oscillator B needs external
        refreshing and will be exposed to potential spoofing
    for t = 0; until t = τ_d; t++; {
      Discipline the Primary Oscillator from Oscillator A; %follow
        the same logic and sync error alerting as used in the
        current oscillator disciplining algorithm in module 34
      if (difference between the Primary Oscillator and Oscillator A is
          greater than epsilon ε for more than ~10 secs) then {
        Assert HW fault; %something has gone wrong since
          these should stay in agreement; continue to try to
          discipline to recover but note a fault. We can
          maintain critical operation by switching to the
          other auxiliary oscilator and stop the algorithm
          in module 34 and we will only lose the spoofing
          detection.}
      Discipline Oscillator B from GNSS; %follow the same logic as
        used in the current design, but don't assert any errors yet.
      if (difference between Oscillator B and Oscillator A is greater
          than epsilon ε for more than ~10 secs) then {
        Assert Spoofing Detected;
        DetectionState = SpoofingDetected;
        DiscipliningState = Holdover;
        exit loop; }
      } %endfor
    } %endloop
} %end Steady State
SpoofingDetected: {
  %Oscillator B has been corrupted. Bring it back to our known
    good frequency of Oscillator A. Continue to discipline the Primary
    Oscillator to Oscillator A, but note we are in Indefinite Holdover now.
  loop {
    Reset Oscillator B to match Oscillator A frequency and time as
      quickly as possible; %this may take several seconds, but no need
      to worry about glitches. Oscillator B's output is not being used
      anywhere, so just force the frequencies to match.
    for t = 0; until t = 0.1 * τ_d; t++; { %stay in this state for some
      period of time, checking if the GNSS signal is back in alignment
      with our known good reference, Oscillator A. In this example stay
      here for 10% of τ_d, our commutation interval, as a start. Recall that
      Oscillator A and B may have different drift rates, so if the spoofing
      persists for τ_d or longer, then reset and try to recover with
      a fresh start.
      Discipline the Primary Oscillator from Oscillator A; %first
        maintain the disciplining of the primary oscillator as before
      Discipline Oscillator B from GNSS; %now attempt to track
        GNSS again and then check if the spoofing is gone.
      if (difference between Oscillator B and Oscillator A is less than
          epsilon ε for more than ~10 secs) then {
        Clear Spoofing Detected Alert;
        DetectionState = SteadyState;
        DiscipliningState = InSync;
        exit loop; }
      } %endfor
    } %endloop
} %end SpoofingDetected
```

Accordingly, in this example and prior to any detected spoofing, the spoofing resistant reference time source system 10(1) includes two additional auxiliary oscillators 24(2) and 24(3). The existing GNSS oscillator disciplining algorithm or module 34 will only discipline one of the auxiliary oscillators 24(2) or 24(3) at a time for a period of $\tau_d$ (~hours). While, for example, #2 oscillator 24(2) is being disciplined, the other auxiliary #3 oscillator 24(3), is free running and is used to discipline the primary #1 oscillator 24(1). The output from the primary oscillator 24(1) drives the time and frequency external outputs for the spoofing resistant reference time source system 10(1), same as in a standard configuration. This is the behavior of the spoofing resistant reference time source system 10(1) in its long-term steady state condition, once all the oscillators 24(1)-24(3) have been initially disciplined and while no fault or spoofing is detected.

Exemplary Alternative Design

Referring to FIG. 6, an alternative example of a spoofing resistant reference time source system 10(2) where additional reliability is realized by having all of the oscillators 24(1)-24(3) configured to be truly redundant. This alternative example of the time server system 10(2) the has the same structure and operations as the time server system 10(1), such as the steady state and spoofing detection operations illustrated and described in the examples herein with reference to FIGS. 1-5b, except as otherwise illustrated and described herein. For ease of illustration, the oscillator management computing device 16 and related components are not shown in detail and/or may be located elsewhere, such as in a cloud computing environment, but are the same in structure and operation as shown in FIG. 1, except as otherwise illustrated and described herein.

In this example, the failure rate drastically improves, much better than a simple standard time server, but as illustrated the complexity is greater. Additionally, in this example the time server system 10(2) is reconfigured as illustrated in FIG. 6 and has the frequency output ensemble combiner system 38 that selectively combines the frequencies of each of the oscillators 24(1)-24(3) to create a composite output. It is highly desirable to ensure that there are no glitches or discontinuities on the output as the frequency and phase changes in the process. This is what makes this approach complex in both hardware and software, but provides better reliability having enhanced MTBF.

Another Exemplary Alternative Design

Figure 7:
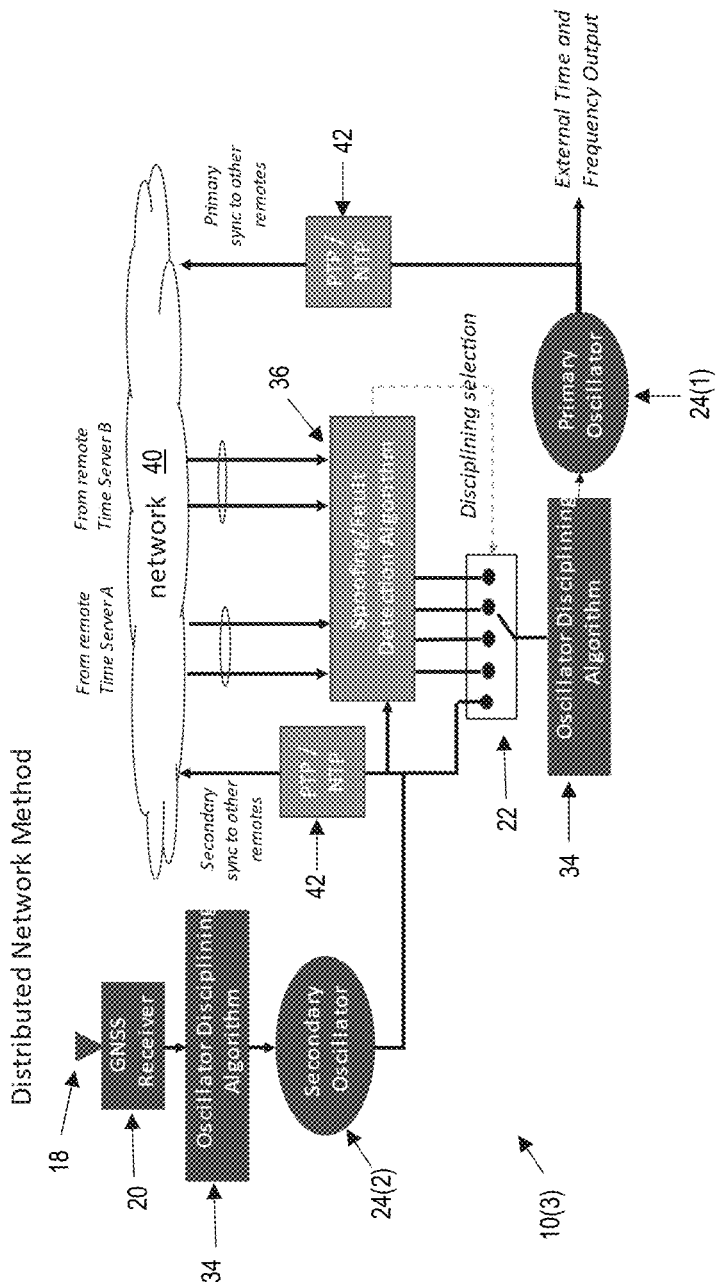
FIG. 7 is a functional block diagram of another example of yet another method for managing steady state and spoofing detection operations with another alternate configuration for the spoofing resistant reference time source system.

Referring to FIG. 7, an alternative example of one of a plurality of spoofing resistant reference time source systems 10(3) where the oscillators are distributed among different ones of the spoofing resistant reference time source systems 10(3) connected over a Time Sensitive Network (TSN) that is capable of exchanging accurate time information. This alternative example of the time server system 10(3) has the same structure and operations as the time server system 10(1), such as the steady state and spoofing detection operations illustrated and described in the examples herein with reference to FIGS. 1-5*b*, except as otherwise illustrated and described herein. Additionally in this example only one of the spoofing resistant reference time source systems 10(3) is shown and the other are the same in structure and operation, although one or more of the spoofing resistant reference time source systems 10(3) could have other types and/or numbers of other components and/or other elements in other configurations.

In this example, networks 40 using the Precise Time Protocol (PTP) or the Network Time Protocol (NTP) 42 can exchange time and frequency information among many time server systems 10(3), although there are other methods may be used for this exchange. Additionally, in this example, each of the time server systems 10(3) comprises two oscillators: a primary 24(1) and a secondary 24(2) with the additional third or more oscillators accessed at other ones of the time server systems 10(3) as needed for managing steady state and spoofing detected operations as previously illustrated and described by way of the examples herein. Accordingly in this example, each of the time server systems 10(3) shares the time and frequency synchronization information from both oscillators 24(1)-24)2), i.e. a primary and a secondary, onto the network for access by all other ones of the time server systems 10(3).

The modules 34 and 36 in the oscillator management computing device 16 in each of the time server systems 10(3) function in a substantially similar manner as before with the primary oscillator 24(1) providing the local time and frequency output. The secondary oscillator 24(2), in this example, serves as one of the auxiliary oscillators and one or more remote oscillators at another one of the time server systems serves as the other auxiliary oscillators. The one of the spoofing resistant tine server systems 10(3) chooses the best remote oscillator from another one of the spoofing resistant reference time source system 10(3) or other sources in the network to discipline its local primary oscillator based on the advertised status of all the remotes. The local secondary oscillator 24(2) is disciplined from the GNSS signal and is therefore subject to corruption, so it is not used in the disciplining process until the desired disciplining duration time, $\tau_d$, has expired, at which time it can be determined there was no corruption in the previous interval.

In another variant of this design, the processing done by the oscillator management computing device 16 in this and in other examples can be located in a network cloud, not in the local time server system.

Figure 8:
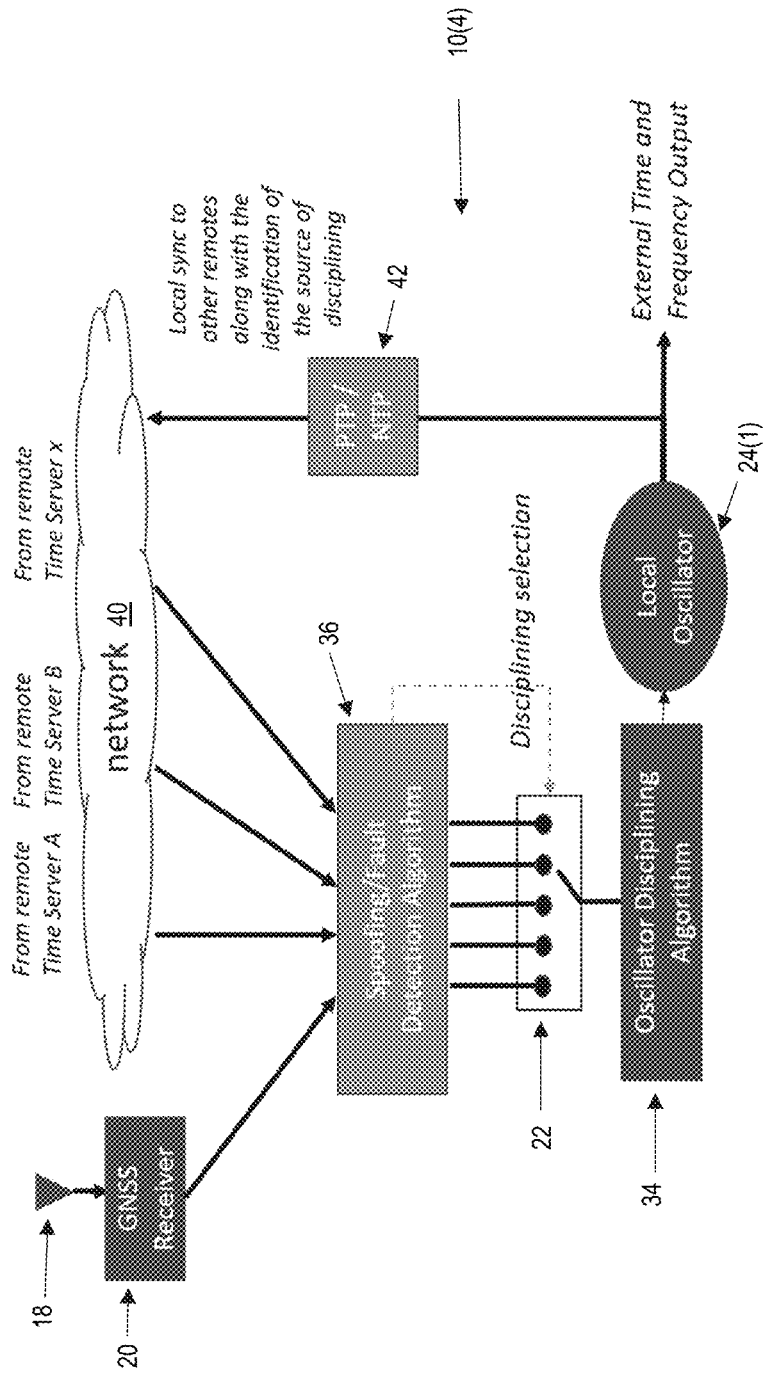
FIG. 8 is a functional block diagram of further example of yet another method for managing steady state and spoofing detection operations with a further alternate configuration for the spoofing resistant reference time source system.

Referring to FIG. 8, a further example of one of a plurality of spoofing resistant reference time source systems 10(4) where the three or more oscillators are distributed among different ones of the spoofing resistant reference time source systems 10(4) each with one oscillator 24(1) and which are connected over a Time Sensitive Network (TSN) that is capable of exchanging accurate time information. This alternative example of the time server system 10(4) has the same structure and operations as the time server system 10(1), such as the steady state and spoofing detection operations illustrated and described in the examples herein with reference to FIGS. 1-5*b*, except as otherwise illustrated and described herein. Additionally in this example only one of the spoofing resistant reference time source systems 10(4) is shown and the other are the same in structure and operation, although one or more of the spoofing resistant reference time source systems 10(3) could have other types and/or numbers of other components and/or other elements in other configurations.

In this example, each of the spoofing resistant reference time source systems 10(4) only has one oscillator with all of the other oscillators being located remotely, although the oscillators could be at other locations. The oscillator disciplining algorithm 34 in the of the spoofing resistant reference time source system 10(4) will receive the synchronization information from two or more other oscillators located remotely from the spoofing resistant reference time source system 10(4) via the network 40, but otherwise will execute in the same manner as described in the examples herein. By way of example, the spoofing resistant reference time source system 10(4) will compare the three of more oscillators, one of which may be sourced by the GNSS signal via the GNSS receiver 20 and antenna 18 in this example. The spoofing resistant reference time source system 10(4) will be able to detect when there is corruption of the GNSS sourced oscillator when that oscillator does not agree with the other oscillators. The spoofing resistant reference time source system 10(4) will use the non-GNSS source remote oscillators, such as a statistical combined average of them by way of example, to discipline its local oscillator 24(1), thereby ensuring no corruption locally. Occasionally, The spoofing resistant reference time source system 10(4) will use the GNSS signal to discipline its local oscillator 24(1) and share that on the network 40, taking its turn to use the GNSS signal. When this state occurs, the spoofing resistant reference time source systems 10(4) is taking a risk and subjecting itself to corruption. Therefore, this simpler configuration (only one oscillator per time server) may be less reliable, however, it may still be useful in applications where there is already much redundancy present and the failure of just one spoofing resistant reference time source system is not a major concern. The entire combination of spoofing resistant reference time source systems 10(4) will maintain its resiliency Accordingly, as illustrated and described by way of the examples herein, examples of this technology provide a number of advantages including methods and devices that counter spoofing attacks through unique configurations of multiple redundant disciplines oscillators in a time server system. With examples of this spoofing resistant technology, the time server systems is able to substantially reduce the mean time between failure. Additionally, example of this technology are advantageously able to identify and address various fault conditions in addition to being resistant to spoofing.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An oscillator management system comprising:
   one or more spoofing resistant reference time source systems each comprising one or more oscillators coupled to an oscillator management computing device;
   the oscillator management computing device comprising a memory coupled to a processor which is configured to execute programmed instructions stored in the memory to:
      enter three or more of the oscillators into a normal disciplining steady state when the three or more of the oscillators have output frequency differences among the three or more of the oscillators that are below a set frequency difference threshold, wherein when the normal disciplining steady state is entered:
         discipline only one of the three or more of the oscillators to an external time reference;
         output frequency and time based on the other ones of the three or more of the oscillators not being disciplined to the external time reference; and
         monitor the output frequency difference of the one of the three or more of the oscillators being disciplined by the external time reference and a composite value of the output frequency difference among the other ones of the three or more oscillators;
      identify a spoofing detected state when the monitored output frequency difference is more than the set frequency difference threshold, wherein when the spoofing detected state is identified:
         reset the frequency and time of the one of the three or more of the oscillators in the identified spoofing detected state to match the composite value of all of the other ones of the three or more of the oscillators;
         resume disciplining the one of the three or more of the oscillators in the identified spoofing detected state from the external time reference after expiration of a set time period; and
         clear the spoofing detected state indication and return to the normal disciplining steady state when the three or more of the oscillators have the output frequency differences among the three or more of the oscillators that are below the set frequency difference threshold.

2. The system as set forth in claim 1 further comprising executable code which when executed by a processor causes the processor to:
   initialize the three or more of the oscillators to have the output frequency differences among the three or more of the oscillators that are below the set frequency difference threshold before the normal disciplining steady state is entered.

3. The system as set forth in claim 2 further comprising executable code which when executed by a processor causes the processor to:
   detect a fault with one or more of the three or more of the oscillators when one or more of the output frequency differences among the three or more of the oscillators are above the set frequency difference threshold after expiration of a set initialization time period.

4. The system as set forth in claim 1 further comprising executable code which when executed by a processor causes the processor to:
   periodically swap which one of the three or more of the oscillators is disciplined to the external time reference when in the normal disciplining steady state, not the spoofing detected state.

5. The system as set forth in claim 1 further comprising executable code which when executed by a processor causes the processor to:
   determine the composite value of the output frequency difference among the other ones of the three or more of to oscillators based on a statistical combining method.

6. The system as set forth in claim 1 wherein the statistical combining method comprises an average.

7. The system as set forth in claim 1 wherein the one or more spoofing resistant reference time source systems comprises one of the spoofing resistant reference time source system having at least three of the oscillators.

8. The system as set forth in claim 7 further comprising:
   at least one frequency output ensemble combiner systems coupled to the at least three oscillators.

9. The system as set forth in claim 1 wherein the one or more spoofing resistant reference time source systems further comprises:
   at least two of the spoofing resistant reference time source systems coupled by one or more networks, wherein at least one of the spoofing resistant reference time source systems is configured to have at least two of the three or more of the oscillators interact with one of the of the three or more of the oscillators in another one of the spoofing resistant reference time source systems.

10. The system as set forth in claim 1 wherein the one or more spoofing resistant reference time source systems further comprises:
    at least three of the spoofing resistant reference time source systems coupled by one or more networks, wherein each of the at least three spoofing resistant reference time source systems is configured to have one of the three or more of the oscillators which interact.

11. A non-transitory computer readable medium having stored thereon instructions comprising executable code which when executed by at least one processor, cause the processor to:
    enter three or more oscillators, that are in one or more spoofing resistant reference time source systems, into a normal disciplining steady state when the three or more of the oscillators have output frequency differences among the three or more of the oscillators that are below a set frequency difference threshold, wherein when the normal disciplining steady state is entered:
discipline only one of the three or more of the oscillators to an external time reference;
output frequency and time based on the other ones of the three or more of the oscillators not being disciplined to the external time reference; and
monitor the output frequency difference of the one of the three or more of the oscillators being disciplined by the external time reference and a composite value of the output frequency difference among the other ones of the three or more of the oscillators;
identify a spoofing detected state when the monitored output frequency difference is more than the set frequency difference threshold, wherein when the spoofing detected state is identified:
reset the frequency and time of the one of the three or more of the oscillators in the identified spoofing detected state to match the composite value of all of the other ones of the three or more of the oscillators;
resume disciplining the one of the three or more of the oscillators in the identified spoofing detected state from the external time reference after expiration of a set time period; and
clear the spoofing detected state indication and return to the normal disciplining steady state when the three or more of the oscillators have the output frequency differences among the oscillators that are below the set frequency difference threshold.

12. The medium as set forth in claim 11 wherein the executable code, when executed by the processor, further causes the processor to:
initialize the oscillators to have the output frequency differences among the three or more of the oscillators that are below the set frequency difference threshold before the normal disciplining steady state is entered.

13. The medium as set forth in claim 12 wherein the executable code, when executed by the processor, further causes the processor to:
detect a fault with one or more of the three or more of the oscillators when one or more of the output frequency differences among the three or more of the oscillators are above the set frequency difference threshold after expiration of a set initialization time period.

14. The medium as set forth in claim 11 wherein the executable code, when executed by the processor, further causes the processor to:
periodically swap which one of the three or more of the oscillators is disciplined to the external time reference when in the normal disciplining steady state, not the spoofing detected state.

15. The medium as set forth in claim 11 wherein the executable code, when executed by the processor, further causes the processor to:
determine the composite value of the output frequency difference among the other ones of the three or more of the oscillators based on a statistical combining method.

16. The medium as set forth in claim 11 wherein the statistical combining method comprises an average.

17. The medium as set forth in claim 11 wherein the one or more spoofing resistant reference time source systems comprises one of the spoofing resistant reference time source system having at least three of the oscillators.

18. The medium as set forth in claim 17 wherein the one or more spoofing resistant reference time source systems further comprises at least one frequency output ensemble combiner systems coupled to the at least three oscillators.

19. The medium as set forth in claim 11 wherein the one or more spoofing resistant reference time source systems further comprises:
at least two of the spoofing resistant reference time source systems coupled by one or more networks, wherein at least one of the spoofing resistant reference time source systems is configured to have at least two of the three or more of the oscillators interact with one of the of the three or more of the oscillators in another one of the spoofing resistant reference time source systems.

20. The medium as set forth in claim 11 wherein the one or more spoofing resistant reference time source systems further comprises:
at least three of the spoofing resistant reference time source systems coupled by one or more networks, wherein each of the at least three spoofing resistant reference time source systems is configured to have one of the three or more of the oscillators which interact.

21. A method comprising:
entering, by a computing device, three or more oscillators, that are in one or more spoofing resistant reference time source systems, into a normal disciplining steady state when the three or more of the oscillators have output frequency differences among the three or more of the oscillators that are below a set frequency difference threshold, wherein when the normal disciplining steady state is entered:
discipline only one of the three or more of the oscillators to an external time reference;
output frequency and time based on the other ones of the three or more of the oscillators not being disciplined to the external time reference; and
monitor the output frequency difference of the one of the three or more of the oscillators being disciplined by the external time reference and a composite value of the output frequency difference among the other ones of the three or more of the oscillators;
identifying, by the computing device, a spoofing detected state when the monitored output frequency difference is more than the set frequency difference threshold, wherein when the spoofing detected state is identified:
reset the frequency and time of the one of the three or more of the oscillators in the identified spoofing detected state to match the composite value of all of the other ones of the three or more of the oscillators;
resume disciplining the one of the three or more of the oscillators in the identified spoofing detected state from the external time reference after expiration of a set time period; and
clear the spoofing detected state indication and return to the normal disciplining steady state when the three or more of the oscillators have the output frequency differences among the three or more of the oscillators that are below the set frequency difference threshold.

22. The method as set forth in claim 21 further comprising:
initializing, by the computing device, the three or more of the oscillators to have the output frequency differences among the three or more of the oscillators that are below the set frequency difference threshold before the normal disciplining steady state is entered.

23. The method as set forth in claim 22 further comprising:
detecting, by the computing device, a fault with one or more of the three or more of the oscillators when one or more of the output frequency differences among the three or more of the oscillators are above the set frequency difference threshold after expiration of a set initialization time period.

24. The method as set forth in claim 21 further comprising:
periodically swapping, by the computing device, which one of the three or more of the oscillators is disciplined to the external time reference when in the normal disciplining steady state, not the spoofing detected state.

25. The method as set forth in claim 21 further comprising:
determining, by the computing device, the composite value of the output frequency difference among the other ones of the three or more of the oscillators based on a statistical combining method.

26. The method as set forth in claim 21 wherein the statistical combining method comprises an average.

27. The method as set forth in claim 21 wherein the one or more spoofing resistant reference time source systems comprises one of the spoofing resistant reference time source system having at least three of the oscillators.

28. The method as set forth in claim 27 wherein the one or more spoofing resistant reference time source systems further comprises at least one frequency output ensemble combiner systems coupled to the at least three oscillators.

29. The method as set forth in claim 21 wherein the one or more spoofing resistant reference time source systems further comprises:
at least two of the spoofing resistant reference time source systems coupled by one or more networks, wherein at least one of the spoofing resistant reference time source systems is configured to have at least two of the three or more of the oscillators interact with one of the of the three or more of the oscillators in another one of the spoofing resistant reference time source systems.

30. The method as set forth in claim 21 wherein the one or more spoofing resistant reference time source systems further comprises:
at least three of the spoofing resistant reference time source systems coupled by one or more networks, wherein each of the at least three spoofing resistant reference time source systems is configured to have one of the three or more of the oscillators which interact.

* * * * *